Nov. 15, 1966  R. A. TIGNER  3,285,442
METHOD FOR THE EXTRUSION OF PLASTICS
Filed May 18, 1964
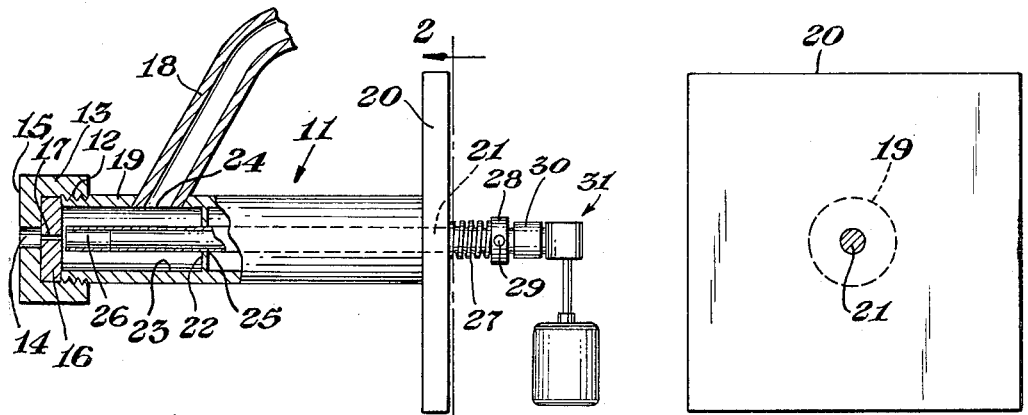
Fig. 1
Fig. 2
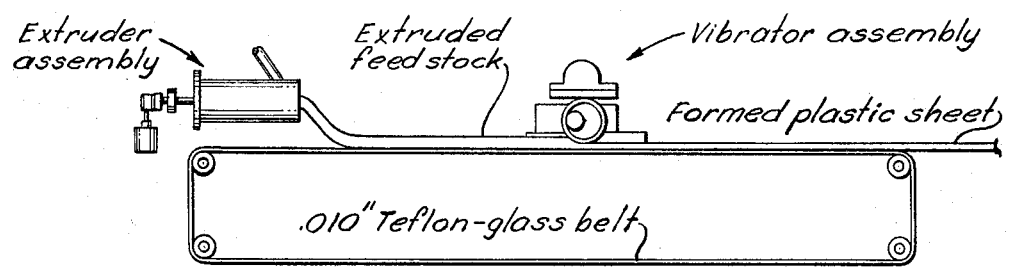
Fig. 4
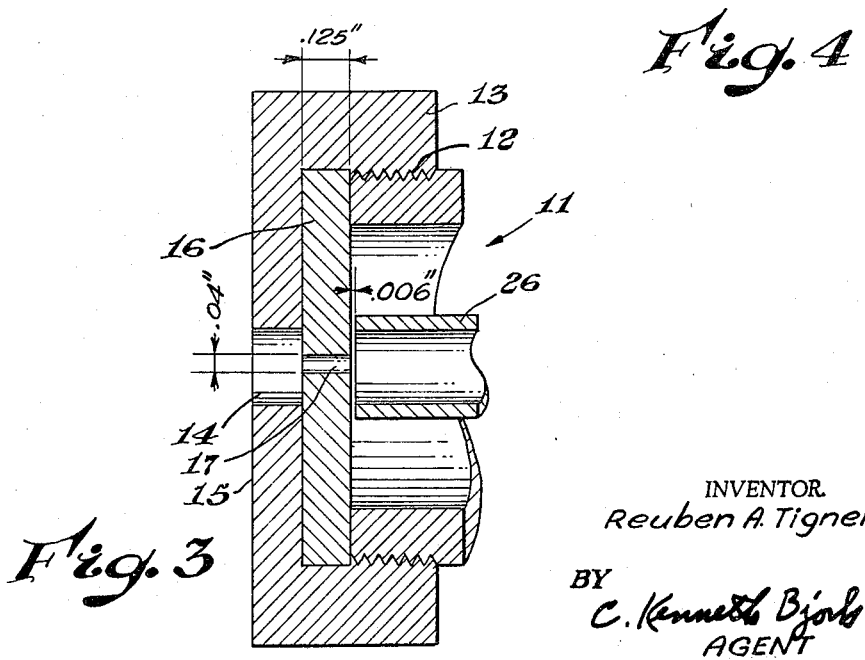
Fig. 3
INVENTOR.
Reuben A. Tigner
BY
C. Kenneth Bjork
AGENT

United States Patent Office 3,285,442
Patented Nov. 15, 1966

3,285,442
METHOD FOR THE EXTRUSION OF PLASTICS
Reuben A. Tigner, Pinconning, Mich., assignor to The Dow Chemical Company, Midland, Mich., a corporation of Delaware
Filed May 18, 1964, Ser. No. 367,986
5 Claims. (Cl. 264—70)

This application is a continuation-in-part of my application Serial No. 92,942, filed March 2, 1961, now abandoned.

This invention relates to a means for forming moldable materials and more particularly is concerned with a novel method for extruding thermoplastic resins in the liquid state.

The handling and movement of viscous, flowable, liquid materials are of paramount importance to the plastic fabricator. This stems from the fact that essentially all of the presently used plastics during certain stages of fabrication are handled in the form of highly viscous liquids.

In general, the present conventional methods and art of forming plastic materials into useful shapes consists of the following steps; (1) supplying a plastic in a moldable, i.e., flowable or pumpable liquid state, (2) forming, by means of high pressures exerted throughout the liquid flowable mass as in the reservoir of an extruder, the viscous material into a desired shape and (3) subjecting the resulting formed material to subsequent steps such as cooling (thermoplastics), heating (thermosetting resins), stretching, etc. to obtain the desired end product.

In this conventional method of forming, particularly extruding, the applied forming pressures are continuous and are exerted equally in all directions throughout the viscous mass. Therefore, a considerable volume of plastic must be subjected to high pressure and, simultaneously, to high shear forces in order to induce the required forming pressure into a small amount of material at the desired forming site, e.g., an extrusion die orifice. Maintaining such high pressure over relatively large volumes of material requires the costly installation and operation of heavy duty, high-pressure producing forming equipment.

Another nonanticipartory process in the art is directed specifically to producing filamentary materials. This process (Finlayson 2,888,711) employs a tamper rod in a tapered tamper container to assure that solid materials falling down through the tapered container are pushed against a heated die plate and build up a solid layer thereon. The solid lawer of feed stock in direct contact with the surface of the heated plate melts and falls through spinning orifices in this plate in the usual manner for producing filaments. The so-formed filaments fall or are drawn away from the orifices. During operation of this filament forming process, particulate solid material from the tapered container is continually supplied and tamped against the plate to assure that a solid layer of material is present and always separates the liquid phase at the heated melt plate from the tamper.

This process is carried out while maintaining a subatmospheric pressure about the powdered feed stock.

This same nonanticipatory process is also taught in Australian Patent No. 152,179, except in the process of the Australian Patent there is no application of subatmospheric pressure during the supplying of the powdered solid material to the heated plate and the drawing away of the fused filaments from this plate.

Both the Finlayson and Australian Patent processes relate to conventional melting plate-filament spinning or drawing operations coupled with a mechanical tamping of a solid feed stock. In these processes the mechanical tamping of the feedstock is to provide a compacted solid layer of material.

It is a principal object of the present invention, therefore, to provide a method for the forming of moldable materials in the liquid state and particularly for the forming of thermoplastic resinous materials, wherein only a small amount of the liquid material being formed is subjected to high pressure.

It is another object of the present invention to provide a method for the forming of viscous plastic materials wherein the forming pressure is discontinuous and pulsating.

It is an additional object of the present invention to provide a novel means of forming moldable materials wherein the size and cost of the forming equipment and power source is markedly reduced over that needed for conventional forming techniques.

It is a further object of the present invention to provide a method for the fabrication of liquid flowable plastic materials which, because of their high viscosity, cannot be formed satisfactorily using the fabrication equipment and techniques ordinarily employed.

It is also an object of the present invention to provide a method of extruding plastic resinous materials wherein there is substantially no back pressure from the die on the viscous mass and the equipment. The absence of this back pressure eliminates the need for pressurizing the melting section of an extruder.

It is another object of the present invention to provide a method for forming a predetermined volume of plastic material per unit time, which volume is independent of irregularities in the viscosity, temperature, etc. of the formable material. The instant method thereby yields uniform films, filaments, fine fibers, molded articles and the like which are substantially free from undesirable variations in thickness and size normally found in products prepared by conventional techniques.

The foregoing and additional objects and advantages will be apparent from the detailed description presented hereinafter and from the accompanying drawing.

In the drawing:
FIGURE 1 is a side elevation partially cut away, showing one embodiment of a forming apparatus useful for carrying out the method of the instant invention.
FIGURE 2 is a sectional view of the forming apparatus of FIGURE 1 taken along line 2—2 of FIGURE 1.
FIGURE 3 is a fragmentary, sectional view of the embodiment of the forming apparatus of FIGURE 1, specifically showing the relationship of die plate thickness, die orifice radius and close distance between die plate face and pulsating piston face.
FIGURE 4 is a schematic drawing of an assembly for forming plastic sheet utilizing a device and method of the instant invention.

The instant method of forming plastic materials utilizing discontinuous and pulsating pressure impulses comprises generally the following steps; (1) providing a plastic material in a liquid moldable form and (2) subjecting a small amount of the liquid material in the vicinity of a die orifice to discontinuous pressure pulses of small amplitude whereby the material undergoes substantially unidirectional flow in a predetermined direction toward the die orifice and is forced through the forming member. The resulting extruded material can be subjected to conventional cooling, heating, hardening, aging or other desired post-forming treatment steps if desired. The term "moldable" as used herein refers to material in a form whereby it can be extruded, injection molded, cast or worked by other similar techniques.

More particularly in practicing the present novel process, a liquid, plastic feedstock is maintained in the liquid state at about atmospheric pressure in the reservoir of an extruder which reservoir communicates with the die plate of the extruder. The liquid feedstock material only in the vicinity of the die orifice; i.e. the small volume of liquid directly between the die plate and the head of a pulsating piston of a reciprocating linear pulse generator is subjected to rapid momentary high pressure pulses during operation. This small amount of material in the vicinity of the die orifice thereby is urged substantially unidirectionally toward the orifice and forced, i.e. extruded, therethrough. As the pulsating action continues, a continuous flow of formed product exits from the die orifice. This product is recovered and subjected to conventional setting and other post-forming treatment.

In this novel process, therefore, at any one time only a very small portion of the entire mass of liquid feed stock in the reservoir is subjected to high pressure. This small volume itself is pressurized momentarily only at the instant that it is being directed toward the die orifice by the pressure pulse. The actual volume of material subjected to the high pressure impulse is of an area defined substantially by the cross-sectional area of the head of the piston of the pulsator and having a maximum length equal to about the total distance between the head of the piston and the face of the die plate when the piston is at its maximum distance away from the die plate during a given cycle of piston pulsation.

A particularly suitable embodiment of a forming device for carrying out the present novel process is the extruder shown in FIGURE 1. This apparatus consists of a hollow body member 11 having exterior threads 12 on one end. An internally threaded caplike cover 13 defining an opening 14 in its face 15 and fitted with a die plate 16 is attached to the body member 11 by means of the corresponding mating external and internal threads. The die plate 16 has a die orifice 17 which mates with the opening 14 in the face 15 of the cap 13.

The body member 11 also contains a feed conduit 18 which is affixed to and has one end penetrating the wall 19 of the body member 11 a short distance away from the end of the cap 13.

On the end of the hollow body member 11 opposite that containing the cap 13 there is affixed a shoulderlike flange 20 by which the assembly can be attached to conventional support brackets (not shown). This flange 20 defines an opening 21, the center of which is coaxial with the center axis of the body member 11.

A guide 22 is attached to the inner wall 23 of the hollow body member 11 above the exit 24 of the feed conduit 18 into the body member 11. This guide 22 also defines a center opening 25 of substantially the same size as opening 21 of flange 20. The opening 25 is also centered with respect to the center axis of the body member 11 in the same manner as opening 21.

One end of a piston 26 is inserted into the body member 11 passing through the openings 21 and 25 of the flange 20 and guide 22 respectively. The piston 26 is of such a size and shape to be freely slidable within these openings. A coil spring 27 is placed on the end of the piston 26 extending outwardly from the flange 20. This spring is held in place by an adjustable collar 28 which is fitted over the piston 26 and held in a predetermined position by a set screw 29. The piston 26 also is fitted with a cap 30.

The cap 30 of the piston 26 is then contacted with a discontinuous pulse generator which produces linear reciprocating motion with the piston-spring assembly such as, for example, a motor driven cam assembly 31.

In utilizing the instant forming device the motor driven cam 31 strikes the cap 30 of the piston 26 thereby forcing the piston 26 to accelerate rapidly a short distance and simultaneously compressing the spring 27. As the cam breaks contact with the cap 30, the compressed spring 27 exerts its influence against the collar 28 of the piston 26 thereby forcing the piston to return to its original position. This cycle is then repeated.

By simultaneously or separately adjusting the rate of cam revolution, height of cam and the tension of the spring a predetermined wave form, stroke amplitude and desired close distance between the end of the piston and the face of the die plate can be established as needed for any given forming operation.

Materials of construction for the discontinuous pressure pulse forming apparatus described herein can be selected from any of a wide variety of conventional metallic structural materials including, for example, brass, iron, ferrous alloys, steels, stainless steel, nickel and the like. The selection of a specific material will be made on the basis of the liquid, moldable material to be processed. Preferably, a material of construction compatible with the moldable plastic is utilized. Construction materials rated for high pressures, as specified for conventional extruders and molding devices are not required because of the relatively low overall pressures involved in the instant method.

The amplitude of the pressure pulses from a cyclic pulse producer, or pressure producing pulsator, used in the present process, ordinarily will range from about 0.005 inch to about 0.040 inch. However, an amplitude of 0.100 inch or more can be used satisfactorily in certain applications such as the movement of large volumes of viscous materials.

The smallest clearance between the force impulse producer, i.e. pulsator, and the forming member, i.e. die plate which can be utilized is that minimum distance which still permits flow of a given plastic from the reservoir into the die orifice area. The maximum clearance utilized is that distance through which the pressure pulses impressed on the plastic effectively act to promote the forming of the material through the die orifice.

In general, the clearance, at close position, between the pulsator and forming member, for example, the piston 26 and die plate 15 respectively of the embodiment of the forming device shown in FIGURE 1, will be of the some order of magnitude as the amplitude of the pulsator, and, preferably these distances will be of about equal lengths. At larger close clearances, between the pulsator and a given forming member, satisfactory material flow from the reservoir into the forming area and subsequently out through the forming member can be achieved at pulse amplitudes which are different, i.e. larger or smaller, than this close clearance distance.

The wave form or pattern of pressure impulse utilized in the instant process can be sine wave, sawtooth, pulsed or any intermediate combination of these wave forms. Preferably, a nonsymmetrical wave form, for example, a sawtooth pressure wave will be utilized as this gives the optimum amount of plastic flow per unit time at a given power input.

The energy source for producing the discontinuous pressure pulses can be any of a wide variety of apparatus and devices. These include, for example, a motor driven cam and follower acting on a piston, solenoid coil, electromagnetic transducer, magnetostrictive transducer, hydraulically operated piston, electrostrictive transducer, air driven plunger, vibrator driven-vibrating member, piezoelectric crystals and the like.

The method of the instant invention is particularly useful in the forming of a wide variety of moldable plastic materials including, for example, polystyrene, polyethylene, polypropylene, cellulose, vinyl polymers, styrol resins, urea formaldehyde resinoids, phenol-aldehyde resins, superpolyamide acrylate polymers, saran, nylon, $\alpha$-methylstyrene resins and the like materials which can be obtained in a liquid flowable form. Although the method is applicable in forming low temperature and solvent containing fluid thermosetting and catalytically set plastics and resins it finds particular utility in the forming of thermoplastic resins.

Ordinarily, the plastic feedstock used in the forming apparatus will be of the viscosity now used in present commercial operations. However, this is not essential nor a limiting factor. Both low viscosity (less than 1 poise) and highly viscous materials (5 kilopoise or more) which at present cannot be formed satisfactorily can be successfully handled by the means of the present invention.

As set forth hereinbefore, the actual forming of the moldable material is achieved by subjecting only a small amount of the plastic in the vicinity of a forming member, e.g., extrusion-die orifice, injector of injection molding machine, etc., to discontinuous pressure pulses of small amplitude. Such directed force impulses subject only a small amount of the total volume of plastic to momentary high pressures. The remainder of the material in the feedstock supply, e.g. melter feed conduit and forming apparatus reservoir of thermoplastic extruder, is subjected to substantially only atmospheric or ambient system pressures.

Satisfactory forming results using mechanically or electromagnetically pulsating discontinuous pressure impulses of from less than 1 up to about 1000 or more cycles per second. Advantageously, such impulses at from about 10 to about 360 cycles per second will be employed and preferably the pressure impulses will range from about 30 to about 150 cycles per second.

Additionally, ultrasonic generators, i.e. magnetostructure devices, piezoelectric crystals, electromagnetic transducers, electrostrictive transducers and the like also give satisfactory forming at frequencies up to 40,000 cycles per second or more.

As an aid in utilizing the instant forming method, a mathematical guide has been developed which presents, theoretically, on the basis of certain assumptions, the theoretical close distances needed between a given pulsator and a given forming member to be used in forming a given amount of plastic per unit time.

The development of this guide is better understood when applied utilizing as a typical forming device the apparatus shown in FIGURE 1.

In forming by means of this device, the basic phenomenon to be considered is the effect of a flat surface, i.e. the face of the piston, accelerated through a large body of the viscous moldable liquid material held in a hollow chamber or reservoir of the forming apparatus. The force required to accelerate the piston surface against the resistance of the viscous liquid must be balanced by a counter force in the body of the liquid which is sufficient to cause the plastic to flow. Rapid, controlled, pulsating accelerations of the piston produced by the driving mechanism in turn translates into corresponding large pressure forces induced in the relatively small volume of the liquid directly in front of the flat surface of the piston end. In the presence of an opposing surface, parallel to and directly in line with the accelerating surface, the force required to produce the viscous flow will be borne by this opposing surface. When this surface contains an orifice, such as the die plate of the apparatus shown in FIGURE 1, the viscous liquid, because of the induced forces, will flow through the orifice and forming is accomplished.

In this operation the fluid displaced by the piston is subject to forces from three different types of viscous flow: (1) flow between parallel plates (piston head surface and die plate), (2) flow through a straight tube (die orifice) and (3) flow through an annular space (annulus between piston and inner wall of hollow body member).

Preliminary studies indicated that the flow between parallel plates and through a straight tube are the only significant factors to be used in the development of the mathematical statement. The flow through an annular space, because of the dimensions and volumes involved is of little effect. The formulae to be used for computing these two flow components of major significance are as follows:

Fluid flow for circular parallel plates $$Q_1 = \frac{2h^3 \pi \Delta p}{3n} \quad (1)$$

Fluid flow for straight tube $$Q_2 = \frac{\pi \Delta p r^4}{8n1} \quad (2)$$

where $Q_1$=volume/minute of fluid flow for circular parallel plates
$Q_2$=volume/minute of fluid flow for a straight tube
$h$=distance between parallel plates (piston and orifice plate) at close position (inches)
$l$=length of tube (die orifice) inches
$p$=induced pressure (pounds/square inch)
$n$=viscosity of the fluid
$r$=radius of tube (die orifice) inches By arbitrarily equating $Q_1$ and $Q_2$, theoretically 50 percent of the available viscous material flow (from the piston displacement) is directed through the die orifice. Since the pressure is common to and the same in both types of flow, by equating the flow, the pressure also is equal in both equations.

If $Q_1 = Q_2$, then $$\frac{2h^3 \pi \Delta p}{3n} = \frac{\pi \Delta p r^4}{8n1} \quad (3)$$

Cancellation of common terms in both equations and rearranging yields the equality $$\frac{2h^3}{3} = \frac{r^4}{8l} \quad (4)$$

Equation 4 then gives the dimensional ratio of piston, die plate and die orifice needed to gain a theoretical efficiency of 50 percent, i.e. 50 percent of the total volume displacement extruding through the die orifice.

In actual experimental extrusion runs using an extruder of FIGURE 1 which was set up to conform approximately to the dimensional ratio of Equation 4, α-methyl styrene resins having viscosities ranging from less than 1 kilopoise up to about 6 kilopoise were formed. The extrusion efficiencies, i.e. volume passed through the die orifice, which were obtained using a piston frequency of from about 16 to about 33 cycles per second, a 0.020 inch piston stroke, a 0.040 inch diameter die orifice, a die plate thickness of about 0.125 inch and a close clearance of about 0.006 inch were about 10 percent higher than the 50 percent theoretically predicted.

One reason which can account for the increased forming efficiency actually obtained over that predicted theoretically is the added resistance to backward flow encountered in the annulus between the piston and inner wall of the body member. This resistance serves to increase the flow through the extruder die over that theoretically calculated.

The present method of forming finds utility in extruding, injection molding, sheet preparing and other plastic forming operations. The method is applicable to single forming operations or to an installation wherein a combination of integrated forming techniques is carried out to prepare a given product.

The following examples will serve to illustrate further the present invention but are not meant to limit it thereto.

*Example 1*

An extruder of design similar to that shown in FIGURE 1 was set up to conform approximately to the dimensional ratio given in Equation 4. The actual pertinent dimensions utilized in the experimental setup were $h=0.010$ inch, $l=0.125$ inch and $r=0.02$ inch. The amplitude of the pressure impulse was approximately the same as the distance $h$, or 0.010 inch.

A feed stock of α-methyl styrene resin viscosity about 5 kilopoise at room temperature was fed into the reservoir at about 25° C., and forced through the 0.040 inch diameter circular die orifice by subjecting it to discontinuous pressure pulses at a fixed frequency. The volume of plastic extruded, as about 0.009–0.010 inch diameter resulting set filaments, was noted. The results of a number of tests run at a number of fixed piston pulsating frequencies are presented in Table I which follows.

TABLE I

| Test No. | Pressure Pulse Frequency, cycles/sec. | Total volume displaced, cu. in./min. | Observed extrusion rate, cu. in./min. | Calculated extrusion rate, cu. in./min. | Extrusion Efficiency, Percent |
|---|---|---|---|---|---|
| 1 | None (control) | (Substantially no flow through orifice) | | | 0 |
| 2 | 167 | 0.98 | 0.61 | 0.49 | 62 |
| 3 | 334 | 1.95 | 1.22 | 0.98 | 62 |
| 4 | 667 | 3.92 | 1.83 | 1.96 | 47 |

*Example 2*

A forming apparatus as shown in FIGURE 1 was prepared using a 1 inch diameter piston and a cylindrical feed stock reservoir (body member) of about 1.5 inches inside diameter. A variable speed motor was used as a cam driver in order to evaluate the effect of piston pressure pulse frequency on forming rate. For test purposes, the forming apparatus was mounted in a vertical position with the die orifice being at the bottom of the apparatus. This particular setting was used in order to use simple gravity flow of the plastic through the orifice as a control. The piston stroke was maintained at an amplitude of about 0.01 inch, the die orifice diameter was about 0.0625 inch and the thickness of the die plate was about 0.125 inch.

A quantity of an α-methyl styrene resin, viscosity about 6.5 kilopoise, as measured at about 25° C., was placed in the reservoir. A number of test runs were made at preset close clearance ($h$ of Equation 4) of die plate and piston surface. Flow rates of the extended filament, expressed as total volume of plastic formed per unit time, were measured for several pressure pulse frequencies at each close clearance setting.

The results of these runs are shown in Table II which follows:

TABLE II

| Run No. | Close Clearance (h), inch | Pressure Pulse (Frequency), cycles/sec. | Material Flow Rate (through orifice), cc./min. | Remarks |
|---|---|---|---|---|
| 1 | 0.10 | None (control) | 0.4 | Simple gravity flow. |
| 2 | 0.10 | 66 | 0.6 | |
| 3 | 0.10 | 145 | 4.5 | |
| 4 | 0.06 | 65 | 1.5 | |
| 5 | 0.06 | 150 | 9.0 | |
| 6 | 0.03 | 63 | 2.0 | |
| 7 | 0.03 | 147 | 9.5 | |
| 8 | 0.01 | 68 | 12.5 | |
| 9 | 0.01 | 140 | 17.0 | Some air entrapped and pulled through orifice. |

A second series of tests were run on the same resin utilizing a modification of the forming apparatus described previously in this Example. For these tests, a piston of about 0.05 inch diameter was utilized and a die plate containing 8 orifices of about 0.08 inch diameter each. The amplitude of the piston stroke was maintained at about 0.01 inch, the same as for the previous series. The results of the multiple filament extrusion, expressed as total plastic flow rate per unit time, obtained from this second series of tests are presented in Table III which follows:

TABLE III

| Run No. | Close Clearance (h), inch | Pressure Pulse (Frequency), cycles/sec. | Material Flow Rate (through orifice), cc./min. | Remarks |
|---|---|---|---|---|
| 1 | | None (control) | 0 | Simple gravity flow. |
| 2 | 0.10 | 73 | 3 | |
| 3 | 0.10 | 144 | 6 | |
| 4 | 0.06 | 66 | 7 | |
| 5 | 0.06 | 126 | 34 | |
| 6 | 0.03 | 56 | 5 | |
| 7 | 0.03 | 130 | 52 | |
| 8 | 0.02 | 70 | 4 | |
| 9 | 0.02 | 124 | | Air trapped in system. |
| 10 | 0.01 | 69 | 8 | |
| 11 | 0.01 | 120 | | Do. |

*Example 3*

An extruder of design similar to that shown in FIGURE 1 was set up utilizing the following critical dimensions, 0.04 inch diameter die orifice, 0.125 inch die plate thickness and a piston amplitude of about 0.01 inch. The close distance between the piston face and die plate face was varied as well as were the cyclic frequency for different runs to determine the effect of these variables on fluid flow rates. The reservoir had a diameter of about 1.5 inches and the piston diameter was about 0.375 inch.

An amount of a given plastic was introduced into the reservoir of the extruder and the fluid flow extruded through the orifice per unit time was determined. For these tests the extruder was set up in a vertical position in order to use gravity flow on the plastic material as a control.

The results of a number of tests run are presented in Table IV.

TABLE IV

| Test No. | Plastic Material | Viscosity | Close Clearance (Piston-Exit Port), inch | Piston Frequency (cycles/sec.) | Flow Rate (grams/min.) | Remarks |
|---|---|---|---|---|---|---|
| 1 | (50% Polyvinyl chloride), (50% Dioctyl phthalate). | [1] 3,792 | Control | | 0.15 | Gravity flow. |
| 2 | | | 0.01 | 66 | 0.55 | |
| 3 | | | 0.01 | 132 | 17.40 | |
| 4 | | | 0.02 | 66 | 0.30 | |
| 5 | | | 0.02 | 132 | 4.50 | |
| 6 | α-Methylstyrene | [2] 600 | Control | | 0.0 | No flow. |
| 7 | | | 0.01 | 66 | 1.8 | |
| 8 | | | 0.02 | 66 | 0.45 | |
| 9 | | | 0.03 | 66 | 0.1 | |
| 10 | | | 0.01 | 132 | 14.0 | |
| 11 | | | 0.02 | 132 | 12.9 | |
| 12 | | | 0.03 | 132 | 9.7 | |

[1] Centistokes, at 25° C. measured using an Ubbelohde Viscosimeter.
[2] Poises at 25° C. measured using laboratory model Parallel Plate Viscosimeter.

Example 4

Plastic sheet polyethylene was formed using an assembly similar to that shown schematically in FIGURE 4. For this operation, viscous polyethylene was extruded into a ⅜" diameter strand by an extruder similar to that shown in FIGURE 1 onto a moving perfluorinated hydrocarbon-silica glass conveyor belt. The so-extruded polyethylene "rope," before any appreciable cooling or hardening had occurred, was passed under a vibrating pressure pulse generating member whereby it was reduced in thickness and increased in width to form a polyethylene sheet about .015 inch thick by about 1.5 inches in width. The forming member comprised a 60 cycle Syntron Electric Vibrator, Type v15B (manufactured by Syntron Co.) affixed to a short length of 2 inch diameter stainless steel pipe. The vibrating pressure pulse former was mounted with respect to the belt so that the close clearance between the pipe and belt was approximately the desired thickness of the sheet.

As the sheet was formed it was found to be of substantially uniform thickness and of comparable quality to the present commercial continuous roll produced material.

In a second run of viscous "rope" of Saran of about the same diameter as the polyethylene stream was extruded onto the moving belt. This material was subjected to discontinuous pulses from the vibrator at a cyclic frequency of about 30 cycles per second. The resulting substantially uniform Saran sheet produced had a thickness of about .005 inch and a width of about 1 inch.

In a manner similar to that described for the foregoing examples cellulose fibers can be formed utilizing a magnetostrictive ultrasonic device generating pressure pulses at about 40,000 cycles per second to extrude the flowable cellulose through a 0.010 inch orifice. A carboxy vinyl polymer can be extruded through a 0.02 inch diameter die orifice in an extruder similar to that shown in FIGURES 1, 2 and 3, at a pressure pulse frequency of about 10 cycles per second utilizing a stroke amplitude of about 0.01 inch wherein the clearance between the force impulse producer and die plate is about 0.01 inch. An α-methylstyrene resin of about 6 kilopoise viscosity can be extruded into fibers in the apparatus described hereinbefore utilizing a piston stroke amplitude of about 0.08 inch and a frequency of about 360 cycles per second and having a close clearance between the piston head and die plate of about 0.01 inch.

Additionally, nylons, phenol-aldehyde resins, styrol resins, urea-formaldehyde, resinoids, polystyrene, polypropylene and the like materials in the liquid state all can be formed satisfactorily by the methods and devices described for the foregoing examples.

Various modifications can be made in the present invention without departing from the spirit or scope thereof for it is understood that I limit myself only as defined in the appended claims.

I claim:
1. A method for extruding plastic material which comprises;
(a) providing an extruder having a die plate defining an orifice, a reservoir for a plastic feed stock material and a reciprocating piston-type pulsator positioned in said reservoir, the piston of said pulsator having a flat face and being parallel to the die plate of said extruder and centered with respect to the center axis of the orifice in said die plate of said extruder, said piston being maintained at close position such that the distance between the face of said piston and said die plate is of the same order of magnitude as the amplitude of said pulsating piston,
(b) introducing into said reservoir a feedstock supply of a liquid, flowable, viscous plastic,
(c) maintaining said plastic feed stock supply in said reservoir as a viscous liquid at substantially atmospheric pressure, said liquid plastic feed stock also being in contact with the die plate of said extruder,
(d) accelerating the face of said piston through the body of said viscous, liquid material in the reservoir of said extruder thereby subjecting only that volume of said liquid plastic material directly between the flat face of said piston and said die plate to rapid, reciprocating linear pressure pulses of at least 1 pulse per second and of amplitude of from about 0.005 to about 0.100 inch from said pulsating piston thereby inducing corresponding large momentary high pressure forces in said volume of said liquid plastic directly between the flat face of said piston and said die plate while maintaining the remainder of said liquid plastic feed stock supply in said reservoir at substantially atmospheric pressure, said high pressure force in said liquid balancing the force required to accelerate the face of the piston against the resistance of said viscous liquid plastic, said force being sufficient to provide flow in said viscous liquid plastic,
(e) bearing said force required to produce said viscous flow in said volume of liquid directly between the flat face of said piston and said die plate by a portion of die plate directly in line with the accelerating piston face thereby inducing viscous flow in said volume of said liquid plastic feed stock subjected to said induced high pressure forces,
(f) flowing said volume of viscous liquid directly between the flat face of said piston and said die plate substantially unidirectionally toward the orifice of said die plate,
(g) forcing said liquid plastic feed stock through said die orifice in a substantially continuous manner by action of said induced high pressure forces on said volume of liquid subjected to said pressure pulses, and
(h) recovering a formed extruded product.

2. The process as defined in claim 1 employing non-symmetrical pressure pulses of frequency from about 10 to about 360 cycles per second, said pulses having an amplitude of from about 0.005 to about 0.040 inch.

3. The process as defined in claim 1 wherein the clearance between said piston face and die plate at close position and the pressure pulse amplitude are of about equal distance.

4. The process as defined in claim 1 wherein the plastic material to be extruded is a thermoplastic member selected from the group consisting of α-methyl styrene resin, saran, polystyrene, nylon and polypropylene.

5. A method for extruding and forming plastic material into a sheet which comprises;
 (a) providing an extruder having a die plate defining a circular orifice, a reservoir for a plastic feed stock material and a reciprocating piston-type pulsator positioned in said reservoir, the piston of said pulsator having a flat face and being parallel to the die plate of said extruder and centered with respect to the center axis of the orifice in said die plate of said extruder, said piston being maintained at close position such that the distance between the face of said piston and said die plate is of the same order of magnitude as the amplitude of said pulsating piston, a moving conveyor belt positioned adjacent the exit of said die orifice and a vibrating pressure pulse generator at a distance from said extruder, said vibrating pressure pulse generator mounted above the belt,
 (b) introducing into said reservoir a feed stock supply of a liquid, flowable, viscous plastic,
 (c) maintaining said plastic feed stock supply in said reservoir as a viscous liquid at substantially atmospheric pressure, said liquid plastic feed stock also being in contact with the die plate of said extruder,
 (d) accelerating the face of said piston through the body of said viscous, liquid material in the reservoir of said extruder thereby subjecting only that volume of said liquid plastic material directly between the flat face of said piston and said die plate to rapid, reciprocating linear pressure pulses of at least 1 pulse per second and of amplitude of from about 0.005 to about 0.100 inch from said pulsating piston thereby inducing corresponding large momentary high pressure forces in said volume of said liquid plastic directly between the flat face of said piston and said die plate while maintaining the remainder of said liquid feed stock supply in said reservoir at substantially atmospheric pressure, said high pressure force in said liquid balancing the force required to accelerate the face of the piston against the resistance of said viscous liquid plastic, said force being sufficient to provide flow in said viscous liquid plastic,
 (e) bearing said force required to produce said viscous flow in said volume of liquid directly between the flat face of said piston and said die plate by a portion of die plate directly in line with the accelerating piston face thereby inducing viscous flow in said volume of said liquid plastic feed stock subjected to said induced high pressure forces,
 (f) flowing said volume of viscous liquid directly between the flat face of said piston and said die plate substantially unidirectionally toward the orifice of said die plate,
 (g) forcing said liquid plastic feed stock through said die orifice in a substantially continuous manner by action of said induced high pressure forces on said volume of liquid subjected to said pressure pulses, thereby to extrude a strand of said plastic onto said moving conveyor belt,
 (h) passing said strand of extruded plastic on said moving belt between said vibration pressure pulse generator and said belt, the close distance between said vibrating pressure pulse generator and said belt being substantially the thickness of the product sheet and subjecting said strand of plastic to discontinuous pressure pulses from said vibrating pressure pulse generator thereby to reduce said strand in thickness and increase said strand in width producing a sheet, and
 (i) recovering the plastic sheet product.

References Cited by the Examiner
UNITED STATES PATENTS
2,888,711  6/1959  Finlayson _____ 264—69
FOREIGN PATENTS
152,179  10/1951  Australia.

ROBERT F. WHITE, *Primary Examiner.*